UNITED STATES PATENT OFFICE 2,519,720

SYNTHESIS OF THIOLACTONES

Joseph Donald Surmatis, Nutley, and Walter Kimel, Highland Park, N. J., assignors to Hoffmann-La Roche Inc., Nutley, N. J., a corporation of New Jersey No Drawing. Application December 22, 1948, Serial No. 66,846

8 Claims. (Cl. 260—309)

The present invention relates to a new method for preparing 3,4-(2'-keto-imidazolido)-thiophanes which can be characterized by the following formula:

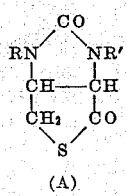

(A)

In the above formula, R and R' stand for aralkyl radicals, as for example, α-aralkyl radicals like benzyl and α- or ring substituted benzyl, for example, α-methyl- and α-ethyl-benzyl, o-methyl-benzyl, p-ethyl-benzyl, p-methoxy-benzyl, or p-ethoxy-benzyl.

The compounds as represented by the above formula are valuable intermediates for the synthesis of biotin and are disclosed in the Goldberg and Sternbach applications, Serial Nos. 673,642, filed May 31, 1946, now Patent No. 2,489,232, and 761,444, filed July 16, 1947, now Patent 2,489,234. The process for preparing the compounds as revealed in the aforementioned applications involves a three-step procedure as follows:

1. A 3,4-(2'-keto-imidazolido)-2-keto-5-acyloxy-tetrahydrofuran of the general Formula B, or the corresponding free aldehydo-acid (C) or its cyclic form (D)

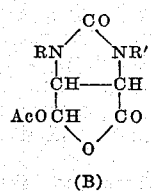

(B)

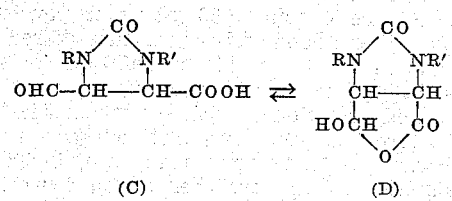

(C)    (D)

in which R and R' have the same significance as in Formula A and Ac stands for acyl, is treated with hydrogen chloride and hydrogen sulfide in an organic solvent such as alcohol, at temperatures below 0° C.

2. The mixture thus obtained is concentrated in vacuo and reacted with an alcoholic solution of an alkali metal hydrosulfide, such as potassium hydrosulfide.

3. The reaction mixture obtained in step 2 is acidified in the cold, extracted with ether, the ether extract concentrated in vacuo and the residue reduced with zinc and acetic acid, the reduced reaction mixture filtered, the filtrate concentrated in vacuo, the residue extracted with ether and the ether solution concentrated, the thiolactone of Formula A crystallizing out after about 20-60 hours.

According to the present invention, we have now found that the thiolactones can be produced by a new and simplified procedure involving essentially two steps.

(1) Reacting the 3,4-(2'-keto-imidazolido)-2-keto-5-acyloxy-tetrahydrofuran of Formula B, or the corresponding free aldehydo-acid (C) or its cyclic form (D) in a solution of an alkali metal hydrosulfide, such as sodium, potassium or lithium hydrosulfide, in an aqueous medium, such as water or a mixture of alcohol and water, preferably by stirring at reflux temperature. It is advantageous to employ an aqueous-alcohol solution, since larger yields are obtained thereby. The alcohol may be a lower aliphatic alcohol such as methyl, ethyl, propyl, and the like. The ratio of alcohol to water may vary over wide limits, as for example, from approximately 95%:5% to 5%:95%. It is preferable to employ an approximately 50 per cent alcohol solution, since greatest yields are obtained thereby.

(2) Reducing the reaction product obtained from step (1) with nascent hydrogen, as for example, obtained from zinc with an acid, such as acetic acid, or preferably from zinc with dilute hydrochloric acid, since yields obtained were highest when the combination of zinc and hydrochloric acid were employed as the reducing agent. Other metals, such as iron, and other acids such as sulfuric, phosphoric, formic and propionic acids may be employed to produce the nascent hydrogen.

It was found advantageous to treat the reaction product obtained by step (1) prior to step (2) by acidifying it with an acid such as sulfuric or hydrochloric acid, and extracting the reaction product with an inert solvent, such as benzene, toluene, or other hydrocarbon solvents. The acid also decomposes the excess alkali metal hydrosulfide, the hydrogen sulfide formed being swept out of the reaction vessel.

Thus it will be seen that applicants' process eliminates the use of hydrogen sulfide in combination with hydrogen chloride heretofore required and the sub-zero temperatures employed in the previous procedure. Further, the new procedure considerably reduces the time required for producing the thiolactone. In addition, the thiolactone obtained by the new procedure is of such purity that it can be employed directly in the synthesis of biotin without further purification.

The following examples will serve to illustrate the invention.

*Example 1*

In a reaction vessel provided with a stirrer, condenser, and a thermometer, there were placed 16 liters of 50 per cent alcohol-water solution, 3,000 grams of sodium hydrosulfide (NaHS) and 1,000 grams of 3,4-(1',3'-dibenzyl-2'-keto-imidazolido)-2-keto-5-acetoxy-tetrahydrofuran, which hereinafter for the sake of brevity is referred to as "the cycloacetate."

The mixture was stirred at 30-35° C. for one hour, during which time it dissolved to give a green colored solution. The solution was then stirred at reflux temperature for six hours. It was then allowed to cool at 25° C. by standing for 16 hours.

Four liters of benzene were added and concentrated hydrochloric acid was dropped in from a separatory funnel while stirring until the solution was strongly acid. A total of 3500 cc. of hydrochloric acid was required. The benzene layer was separated, washed twice with an equal volume of water and concentrated to a syrup under vacuum.

All the syrupy product was dissolved in seven liters of glacial acetic acid and treated with 3 kg. of zinc dust. The reaction mixture was stirred for 16 hours at 25° C. then for two hours at reflux temperature. The zinc was filtered off and washed first with acetic acid and then with warm benzene. The filtrates were combined and distilled to a syrup under vacuo.

To the residue were added 4 liters of benzene, and then 3 liters of concentrated hydrochloric acid were added in 30 minutes. The stirring was continued for an additional 30 minutes. The benzene layer was separated and washed two times with an equal volume of water. On concentration under vacuum with a hot water bath, a solid crystalline mass was obtained in the flask and was washed with ether. In this manner, 3,4-(1',3' - dibenzyl-2'-keto-imidazolido)-thiophane was obtained with a yield of 60 per cent of theory.

*Example 2*

In a reaction vessel fitted with a stirrer, condenser and thermometer, there were placed one liter of a 50 per cent alcohol-water solution, 300 grams of sodium hydrosulfide, and 100 grams of the cycloacetate. The reaction mixture was stirred for one hour at 30-35° C., giving a green solution. This was then stirred at reflux temperature for six hours and cooled to 25° C. by allowing to stand for 16 hours. 500 cc. of benzene were then added and concentrated hydrochloric acid was dropped in from the separatory funnel until the aqueous layer was strongly acid. The benzene layer was separated, washed twice with water and concentrated to a syrup under vacuum.

The syrup was dissolved in 700 cc. of glacial acetic acid. To this were added 300 grams of zinc dust and the reaction mixture was stirred for 16 hours at 25° C., then refluxed for one hour. The zinc was filtered off and washed well with acetic acid and finally with warm benzene. The solvents were combined and distilled to a light syrup. One liter of benzene was added to the syrup and then 300 cc. of concentrated hydrochloric acid were dropped in while stirring in 30 minutes. The stirring was then continued for another 30 minutes. The benzene layer was separated, washed with water and concentrated under vacuum. A solid mass of white crystals was obtained. The crystals were dissolved in methyl alcohol and ether was then added to the solution to induce crystallization. There was thus obtained 3,4-(1',3'-dibenzyl-2'-keto-imidazolido)-thiophane in a yield of about 62 per cent of theory.

By comparing Example 2 with Example 1, it will be seen that a greater yield of the thiolactone is obtained, even when the volume of the alcohol-water solution is considerably reduced. This is of considerable advantage, since it permits production of larger batches in reaction vessels of the same size.

*Example 3*

100 grams of the cycloacetate, 300 grams of sodium hydrosulfide and 1,000 cc. of a 50 per cent alcohol-water solution were stirred for one hour at 30-35° C., then at reflux temperature for 6 hours. 500 cc. of benzene were added and hydrochloric acid was dropped in until the solution was strongly acid. Then without separating the benzene layer as in the previous two examples, 500 cc. of acetic acid and 300 grams of zinc dust were added. The mixture was stirred for 16 hours at 25° C., then refluxed while stirring for four hours. The benzene layer was separated and stirred together with 500 cc. of concentrated hydrochloric acid for one hour. The acid layer was removed and the benzene layer was washed twice with water and concentrated under vacuum. The residue was taken up in ether and the thiolactone was permitted to crystallize. The yield of the thiolactone obtained was 32 per cent of theory.

*Example 4*

500 cc. of ethyl alcohol, 200 grams of the cycloacetate, 500 cc. of water and 300 grams of sodium hydrosulfide were placed in a reaction vessel in the order named, and stirred for two hours at 25° C., then for 6 hours at reflux temperature. The reaction mixture was cooled to 25° C. by allowing to stand for 16 hours. 1600 cc. of benzene were added and 350 cc. of concentrated hydrochloric acid were dropped in from a separatory funnel. When the reaction mixture was strongly acidified, the aqueous layer turned white in color, while the benzene layer was a deep yellow. The benzene layer was separated, washed with water and concentrated under vacuum to a syrup.

The syrupy product was taken up in 1400 cc. of glacial acetic acid. 500 grams of powdered zinc were then added and the mixture stirred for 16 hours at 25° C., and then refluxed for two hours. The zinc was filtered off, washed with acetic acid and finally with benzene. The filtrates were combined and distilled to a syrup under vacuum. The syrup was taken up in 500 cc. of benzene. There were then added 400 cc. of hydrochloric acid, while stirring for 30 minutes. The mixture was stirred for an additional 30 minutes and the benzene layer was separated, washed with water and distilled under vacuo to give a white crystalline residue. This was taken up in ether, cooled for 4 hours at 4° C. and filtered. The amount of 3,4-(1',3'-dibenzyl-2'-keto-imidazolido)-thiophane thus obtained was 60 per cent of theory.

Example 5

In a reaction vessel provided with stirrer and condenser, there were placed 1500 cc. of ethyl alcohol and 500 grams of the cycloacetate. This mixture was stirred for 30 minutes in order to break up all the lumps of the cycloacetate. 1000 cc. of water and 750 grams of sodium hydrosulfide were then added in the order named. The mixture was stirred for two hours at 25° C. and finally for 6 hours at reflux temperature, then allowed to cool for 16 hours. To the reaction mixture were added 2,000 cc. of benzene, and concentrated hydrochloric acid were then slowly added while stirring until the solution was strongly acid. A total of 850 cc. of the acid was added.

The aqueous layer was siphoned off and discarded. To the benzene solution there were added 2,000 cc. of water, 250 grams of zinc dust and 685 cc. of concentrated hydrochloric acid. The reaction mixture was stirred for 2¾ hours at 40° C. The temperature was then held at 50° C. for 1½ hours and finally for one hour at 60° C. It was then allowed to cool to 25° C. The benzene layer was separated and washed twice with 500 cc. of water. It was then concentrated to a syrup under vacuum, taken up in ether, and cooled to 25° C. The thiolactone was obtained in yield of approximately 63 per cent of theory.

The procedure in this example eliminates a concentration step of the benzene solution prior to the reduction step, thereby further shortening the process.

Example 6

1500 cc. of alcohol, 500 grams of the cycloacetate, 1,000 cc. of water and 500 grams of sodium hydrosulfide were placed in the order named in a reaction vessel and stirred for 2 hours at about 25° C. The mixture was then stirred at reflux for six hours, after which it was allowed to cool to about 25° C. 2,000 cc. of benzene were added and about 500 cc. of concentrated hydrochloric acid dropped in gradually while stirring. The aqueous layer was siphoned off and discarded. To the remaining oily layer, there were added 2,000 cc. of water, 250 grams of zinc dust and 685 cc. of concentrated hydrochloric acid. The mixture was then stirred for 2 hours at 40° C., 1 hour at 50° C. and for 1 hour at 60° C. The benzene layer was separated, washed twice with 500 cc. of water and concentrated to a syrup under vacuum. The white crystalline residue was taken up and cooled for 4 hours at about 4° C. and filtered. The thiolactone was obtained in the yield of 63 per cent of theory.

Instead of employing the cycloacetate in the above examples, there can also be employed the corresponding free aldehydo-acid, 1,3- dibenzyl-cis-4-carboxy-5-formyl-imidazolidone - 2 or its cyclic form 3,4 - (1',3' - dibenzyl - 2' - keto-imidazolido)-2-keto-5-hydroxy-tetrahydrofuran.

The 3,4-(1',3'-dibenzyl-2'-keto - imidazolido)-2-keto-5-acetoxy-tetrahydrofuran or the corresponding free aldehydo-acid or its cyclic form, employed as the starting materials can be prepared as described in the aforesaid Goldberg and Sternbach patent applications, in the following manner:

To a stirred, ice-cooled solution of 648 grams (1.98 moles) of bis-benzylaminosuccinic acid in 2 liters of 3 N potassium hydroxide are added in small portions (within 1½ hours) 1.6 liters of a 3.75 molar solution of phosgene in xylene (=6 moles $COCl_2$) and 2.7 liters 6 N potassium hydroxide (=14 moles). The mixture is then acidified with concentrated hydrochloric acid, and the precipitate is then washed thoroughly with hot alcohol, and the aqueous filtrate is extracted several times with ethyl acetate. The alcoholic solution and the ethyl acetate extract contain all the imidazolidone-dicarboxylic acid formed. The alcohol insoluble part of the precipitate is pure starting material. The alcoholic and ethyl acetate solutions are taken to dryness, and the residue is refluxed with benzene until it becomes completely crystalline. The cooled mixture is filtered; the main part of the dibenzyl-imidazolidone-dicarboxylic acid remains on the funnel. It can be recrystallized from ethyl acetate forming prisms, melting first at 167° C., then resolidifying again and melting at 236° C.

The benzene mother liquor is concentrated in vacuo, and the rest of the reaction product is isolated in the form of its anhydride in the following way: The oily residue is refluxed with acetic anhydride, then the mixture is concentrated and benzene is added. The anhydride formed crystallizes in nice needles melting at 236–237° C.

A mixture of 100 grams of the anhydride of 1,3 - dibenzyl - imidazolidone - (2)-cis-4,5-dicarboxylic acid, 150 grams of zinc dust, 100 grams zinc powder (40 mesh), 1500 cc. acetic anhydride and 500 cc. acetic acid is stirred and refluxed for 10–15 hours. The dicarboxylic acid can be used instead of the anhydride. In that case, the acid is first mixed with the acetic anhydride, refluxed for 10 minutes and then the other constituents are added. The amounts of acetic acid and anhydride can be reduced to about ½ without affecting the yield. If too little is used, the yield is reduced. After that time, the mixture is cooled, filtered and the precipitate on the funnel washed with ethyl acetate. The filtrate is concentrated in vacuo, and the oily or partly crystalline residue is treated with ice water and ethyl acetate, until all the organic substance is dissolved. The ethyl acetate layer is washed with water, dried with sodium sulfate and concentrated in vacuo. The oily or partly crystalline residue is boiled up with acetic anhydride, in order to reconvert any of the compound decomposed during the treatment with water into the cyclic acetate. The mixture is again concentrated in vacuo. Xylene is then added to the residue, and part of it is distilled off in vacuo, then ether and petrol-ether are added. The reaction product separates in fine needles or prisms which melt at 103–104° C. After drying, the melting point is 124–125° C.

*1,3 - dibenzyl-cis-4-carboxy-5-formyl-imidazolidone-2-or its cyclic form 3,4-(1',3'-dibenzyl-2'-keto-imidazolido)-2-keto-5-hydroxy-tetrahydrofuran*

An excess of 3 N sodium hydroxide solution is added to a solution of the acetate of the cyclic form of 1,3 - dibenzyl - cis-4-carboxy-5-formyl-imidazolidone-2 in dioxane. After 2 minutes the mixture is acidified with dilute sulfuric acid and extracted with ether. The ether extract is washed, dried with sodium sulfate, and concentrated in vacuo. The residue is recrystallized from a mixture of acetone, ether and petrol-ether.

The compound crystallizes in colorless needles or prisms melting at 109–110° C.

Instead of employing the 3,4-(1',3'-dibenzyl-

2'-keto-imidazolido)-2-keto-5-acetoxy-tetrahydrofuran, the corresponding 3,4-(1,3-di-p-methoxybenzyl - 2'-keto-imidazolido)-2-keto-5-acetoxy-tetrahydrofuran may be employed as starting material, in which case the corresponding thiolactones are obtained. It will be understood that instead of the 5-acetoxy-tetrahydrofuran, the corresponding analogous lower aliphatic acid derivatives can also be employed, as for example, the propionate or the butyrate. These acyl derivatives can be prepared in the same way as the acetate; namely, by carrying out the reduction of the anhydride of the 1,3-disubstituted-imidazolidone-(2)-cis-4,5-dicarboxylic acid with zinc in the presence of the corresponding lower aliphatic acid and its anhydride.

The 1,3 - di - p - methoxybenzyl-intermediates can be prepared in the following manner as described in the Goldberg and Sternbach applications.

*Cyclic acetate of 1,3-di-p-methoxybenzyl-cis-4-carboxy-5-formyl-imidazolidone-2* or

*3,4 - (1,3 - di-p-methoxybenzyl-2'-keto-imidazolido)-2-keto-5-acetoxy-tetrahydrofuran*

112 grams of 1,3-di-p-methoxybenzyl-imidazolidone-(2)-cis-4,5-dicarboxylic acid are refluxed for 10 minutes with 840 cc. of acetic anhydride. The clear solution is cooled slightly; 325 grams of zinc dust and 330 cc. acetic acid are added, and the reaction mixture is stirred and refluxed for 16 hours. After cooling, ethyl acetate is added and the zinc and zinc acetate is extracted 3 times with boiling ethyl acetate. The combined ethyl acetate washings and filtrates are concentrated in vacuo, and the residual oil is treated with benzene. After allowing the solution to stand for a few hours at room temperature, zinc acetate and unchanged starting material are separated by decantation. After distilling off the benzene in vacuo, the residue crystallizes upon treatment with ether and petrol-ether. M. P. 80–93° C. After two recrystallizations from acetone-ether, the melting point is 110–111° C.

Alternatively, the anhydride of the dicarboxylic acid can be reduced with zinc in a mixture of acetic acid and acetic anhydride to form the cyclic acetate.

1,3 - di - p-methoxybenzyl-imidazolidone-(2)-cis-4,5-dicarboxylic acid can be prepared by reacting meso-dibromo-succinic acid with p-methoxybenzyl-amine to form meso-bis-p-methoxybenzylamino-succinic acid, and condensing the latter with phosgene.

We claim:

1. A process for producing 3,4-(1',3'-diaralkyl-2'-keto-imidazolido) - 2 - keto-thiophanes which consists in reacting a compound from the group consisting of a 3,4-(1',3'-diaralkyl-2'keto-imidazolido)-2-keto-5-acyloxy - tetrahydrofuran, 1,3-diaralkyl-cis-4-carboxy-5-formyl-imidazolidone-2 and its cyclic form, 3,4-(1',3'-diaralkyl-2'-keto-imidazolido)-2-keto-5-hydroxy - tetrahydrofuran with an alkali metal hydrosulfide in an aqueous medium, and reducing the reaction product with nascent hydrogen.

2. A process as in claim 1 in which an aqueous-alcoholic medium is employed.

3. A process as in claim 1 in which the reaction product is treated with zinc in the presence of hydrochloric acid to liberate nascent hydrogen.

4. A process as in claim 1 wherein diaralkyl is dibenzyl.

5. A process as in claim 1 in which the alkali metal hydrosulfide is sodium hydrosulfide.

6. A process as in claim 1 in which sodium hydrosulfide in an approximately 50% mixture of water and alcohol is employed.

7. A process for producing 3,4-(1',3'dibenzyl-2'-keto - imidazolido) - 2-keto-thiophane which consists in reacting 3,4-(1',3'-dibenzyl-2'-keto-imidazolido) - 2-keto-5-acetoxy-tetrahydrofuran with sodium hydrosulfide in an approximately 50% mixture of water and ethyl alcohol by refluxing the mixture and reducing the reaction product with zinc in the presence of hydrochloric acid.

8. A process for producing 3,4-(1',3'-dibenzyl-2' - keto - imidazolido) - 2-keto-thiophane which consists in reacting 3,4-(1',3'-dibenzyl-2'-keto-imidazolido)-2-keto-5-acetoxy-tetrahydrofuran with sodium hydrosulfide in an approximately 50% mixture of water and ethyl alcohol by refluxing the mixture and reducing the reaction product with zinc in the presence of acetic acid.

JOSEPH DONALD SURMATIS.
WALTER KIMEL.

No references cited.